April 27, 1937.　　D. L. HADLEY ET AL　　2,078,662
TOASTER
Filed Sept. 6, 1933　　3 Sheets-Sheet 1

WITNESSES:
E. C. Leiding
H. M. Biebel

INVENTORS
Donald L. Hadley and
Lester Lown.
BY W. R. Coley
ATTORNEY

April 27, 1937. D. L. HADLEY ET AL 2,078,662
TOASTER
Filed Sept. 6, 1933 3 Sheets-Sheet 2
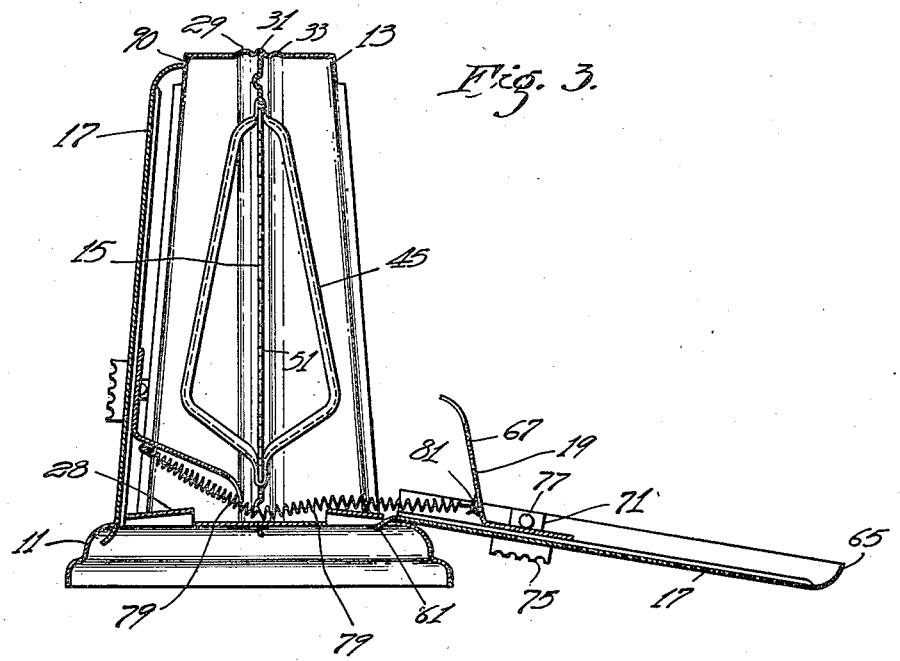
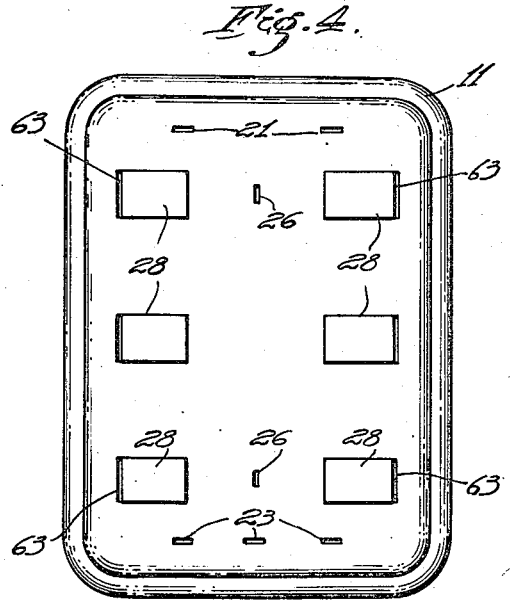
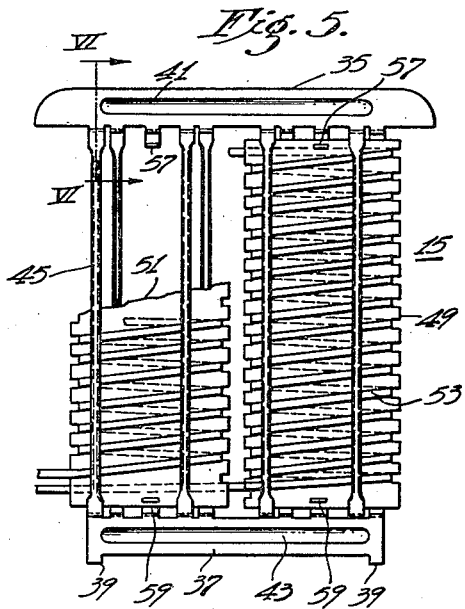
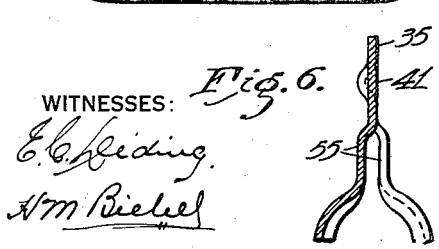
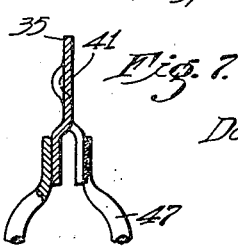
WITNESSES:
E. C. Liding
H. M. Bichel
INVENTORS
Donald L. Hadley and
Lester Lown.
BY W. R. Coley
ATTORNEY

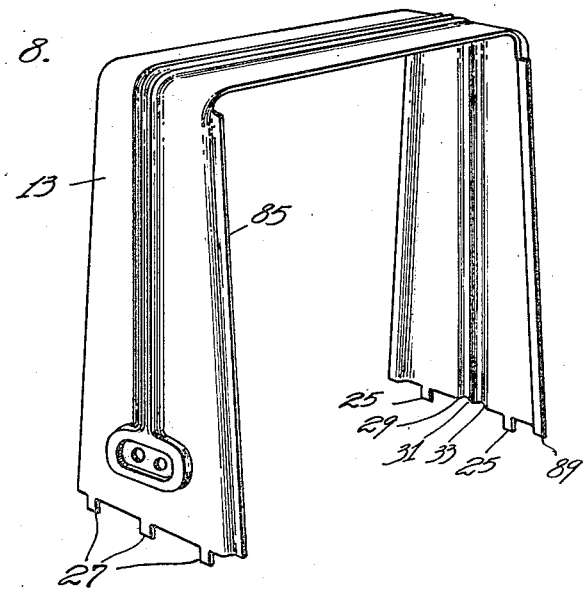
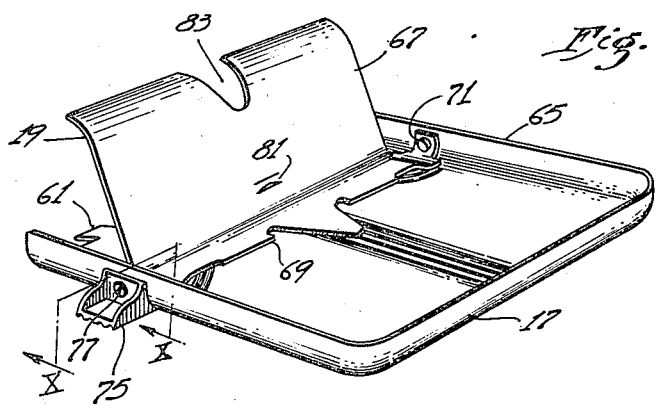
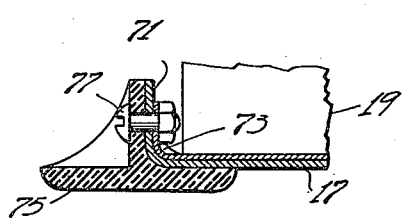

Patented Apr. 27, 1937

2,078,662

UNITED STATES PATENT OFFICE 2,078,662

TOASTER

Donald L. Hadley and Lester Lown, Mansfield, Ohio, assignors to Westinghouse Electric & Manufacturing Company, East Pittsburgh, Pa., a corporation of Pennsylvania Application September 6, 1933, Serial No. 688,303

8 Claims. (Cl. 219—19)

Our invention relates to domestic electric heating devices and particularly to electric toasters.

One object of our invention is to provide an electric toaster that shall embody a minimum number of parts and shall be so designed that it can be easily and quickly assembled.

Another object of our invention is to provide a vertical toaster of the completely enclosed type that shall have a pleasing appearance.

Other objects will either be evident from the description to be hereinafter given of a device embodying our invention, or will be specifically pointed out.

In practicing our invention we provide a structure including a hollow base, a frame of substantially U-shape located thereon in an inverted position, a combined heating element support and bread rack extending between the base and the top of the frame, and a pair of trays having pivotal engagement with the base and adapted to be swung away from and back toward the frame of inverted U-shape.

In the drawings accompanying the application,

Fig. 3 is a view in vertical section therethrough taken on the line III—III of Fig. 1.

Fig. 4 is a top plan view of the base.

Fig. 5 is a view, in side elevation, of the assembled heating element and bread rack.

Fig. 6 is a fragmentary view taken on the line VI—VI of Fig. 5.

Fig. 7 is a view similar to Fig. 6 but showing a modified construction.

Fig. 8 is a view, in perspective, of the frame of inverted U-shape.

Fig. 9 is a view in perspective of one tray, together with the bread support and an actuating knob secured thereto, and Fig. 10 is a view in section of a part of the details shown in Fig. 9, taken on the line X—X thereof.

Our invention has particular reference to vertical toasters of the type in which a movement away from and toward the assembly of one or the other of two trays results in reversing the position of a slice of bread being toasted. Certain details of our invention are, however, not limited thereto and are applicable to other forms of similar devices.

Figure 1:
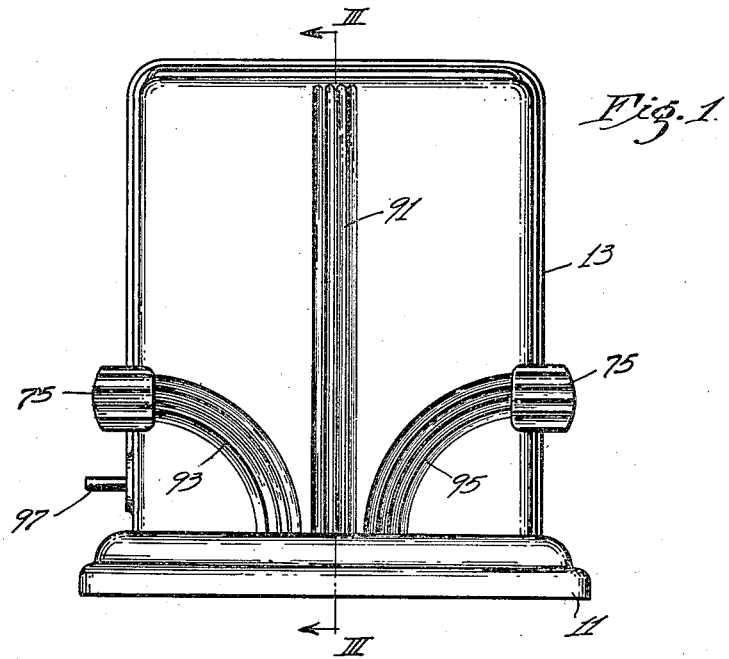
Figure 1 is a view in side elevation of a vertical toaster embodying our invention.
Figure 2:
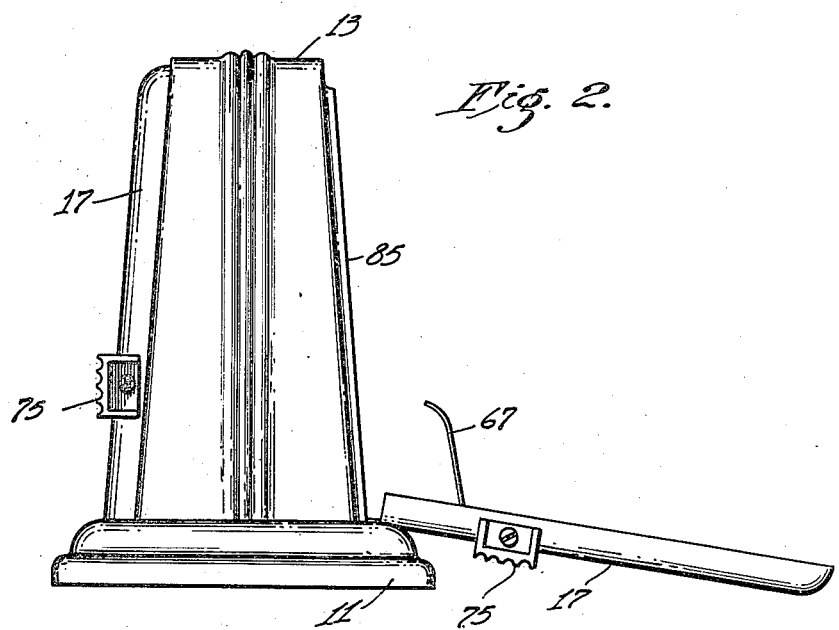
Fig. 2 is a view in end elevation thereof with one of the trays shown in opened position.

Referring to the structure as shown more particularly in Figs. 1 and 2 of the drawings, our device includes a substantially flat-top, hollow base 11 which may be of substantially rectangular form and whose side portions or flanges are of a shape to cooperate with the other parts of the toaster structure to present a pleasing appearance. A frame shown in detail in Fig. 8 and designated by the numeral 13 comprises a plate of substantially inverted U-shape and of varying width and has the edges of its end portions resting upon the hollow base 11. The toaster embodies further a heating element 15 shown in elevation in Fig. 5 of the drawings, and also two swingable trays 17 on the inside of each of which are mounted bread slice supports 19.

Referring first to the hollow base, a top plan view of which is shown in Fig. 4 of the drawings, it may be noted that we provide two spaced openings 21 at one end of the longer dimension of the base and three such openings designated by numeral 23 at the other end of the hollow base 11, which openings are adapted to receive lugs 25 at the end of one leg portion of frame 13 and lugs 27 at the end of the other leg portion of frame 13, these extensions or lugs being adapted to be bent over against the bottom surface of the top of base 11 to firmly secure frame member 13 on the base. Base 11 is further provided with a plurality of spaced openings 26 on the axial center line along the longer dimension of the base and a number of struck-up or bent-out portions 28 are provided, there being three of these adjacent to and inside each of the longer edges of base 11.

The frame plate 13 of substantially U-shape, is provided with a plurality of inner grooves therein designated respectively by numerals 29, 31 and 33, as will be seen by reference to Fig. 3 of the drawings. These grooves which may be pressed into the frame 13, provide substantially similar projections on the outside of the frame as will be noticed particularly in Fig. 2 of the drawings. It will be noted further that the intermediate groove and projection are relatively narrower laterally than are the other grooves 29 and 33 and their corresponding outer projections.

The heating unit 15 includes in one form of our device, a top bar or strip 35 of thin metal, a bottom strip or bar 37 of thin sheet metal having extension lugs 39 depending therefrom, which lugs are adapted to fit into and extend through the hereinbefore described openings 26 in the base. The upper edge of top plate 35 is shaped to fit into the groove 31 in the intermediate or midportion of frame 13, whereby the heating element is securely held in its proper operative position in the toaster assembly. In order to stiffen both the upper plate 35 and the lower plate 37 a groove 41 may be provided in the upper plate 35 and a similar groove 43 may be provided in the lower plate 37 although this is not essential.

In the form of the heater support shown in Figs. 5 and 6 of the drawings, the bread rack members 45, a plurality of which are provided, are integral with the top and bottom plate. The bars or strips 45 are bent or bowed alternately in opposite directions out of the central plane connecting the top and bottom plates 35 and 37, to the shape shown more particularly in Fig. 3 of the drawings, whereby the members 45 on one side of the center line constitute a bread rack for a slice of bread at one side of the toaster, while the other members 45 on the other side of the central plate constitute a bread rack for a second slice of bread on the other side of the toaster.

We do not desire to be limited to a unitary structure and as shown in Fig. 7 of the drawings, members 47 similar to members 45 may be made separate from the top and bottom plates 35 and 37, and have their upper and lower ends welded respectively to the upper and lower plates 35 and 37. Element 15 includes further a plurality of mica sheets or resistor-supporting plates 49 and 51 on which are wound a resistor strip 53 in a manner well known in the art. The upper and lower ends of mica plates 49 and 51 are held in a position alined with plates 35 and 37 by means of portions 55, as shown in Fig. 6 of the drawings, which may be bent outwardly from the plane of plate 35 and plate 37 respectively, and constitute a part of arms 45 or, as shown in Fig. 7 of the drawings, they may be integral with plates 35 and 37, respectively.

Additional lugs 57 may be provided on plate 35 and similar lugs 59 may be provided on plate 37 which may have end portions bent at right angles to the general plane of plates 49 and 51, respectively, and extend through suitable openings at the top and bottom edges of mica plates 49 and 51 to assist in holding them in the positions shown in the drawings.

Referring more particularly to Figs. 2, 3 and 9 of the drawings, we have there illustrated one of the two trays 17 operatively associated with the resistor and it may be noted by reference to Fig. 3 of the drawings that the bottom of each tray is provided with a plurality of depending extensions or tongues 61 which are adapted to fit into openings 63 in the base 11 that are adjacent to the struck-up portions 28 and at the outer edge thereof. The extensions or lugs 61 on each of the trays 17 therefore constitute in cooperation with the openings 63 in the base, hinges for each of the trays, and it is to be noted that the tongues 61 are bent slightly out of the plane of the main part of tray 17 so as to cooperate with the struck-up portions 28 to limit the downward turning movement of each of the trays relatively to the base. Each tray 17 includes a peripheral flange 65 extending around the top and the side edges of the tray.

Means for supporting a slice of bread against the rack constituted by the plurality of bars 45 includes a bread support plate 67, one edge portion of which extends parallel to the inner face of a tray 17 while the main part extends slightly angularly downwardly relatively to the other part, as shown in Figs. 3 and 9 of the drawings. The part 69 of the slice support 67 located adjacent to the inner face of tray 17 is provided with two extensions 71, only one of which is shown in Fig. 9 of the drawings, which extension is adapted to extend along the flange portion 65. Attention may be called to the rounded part of the flange 65 as may be noted more particularly in Fig. 3 of the drawings, and this rounded portion of the flange is changed slightly to have a sharper bend as indicated by numerals 73 in Fig. 10 of the drawings. An actuating knob 75, which is of substantially T-shape, is adapted to fit over and to interfit with the sharper corner 73 as well as with the more round portions of the flange 65 immediately adjacent to the sharper portion 73 in order to interlock the actuating handle or knob 75 with the tray, a short machine screw 77, bolt or rivet extending through one part of the knob 75, through the flange 65 and through the extension 71. This construction holds the knob on the tray and also holds the support 67 in its proper operative position within the tray.

We find it desirable to provide resilient means for assisting the respective trays 17 to return to their normal position, and for this purpose we provide a helical spring 79, whose mid-portion may be operatively engaged with plate 37, the two ends being secured respectively to the slice support 67 in the two trays 17. It is obvious from Fig. 3 of the drawings that the lever arm of spring 79 relatively to the trays is quite small when the trays are in their open position and we therefore wish to point out that the spring 79 is effective only during the final closing movement of each tray to aid in its return to its normal engaged position. A very simple means of securing the ends of spring 79 to the respective support 67 may be constituted by bending out a narrow tongue 81 as shown in Figs. 3 and 9 of the drawings, to which the end of the spring may be hooked as shown in that figure. A recess or notch 83 is provided at the bottom edge of each bread support 67 to receive the spring 79 when the tray is in its raised position.

Attention is further drawn to the fact that each side of frame 13 is provided with longitudinal flange portions 85 and 89 over which the flange 65 of each tray is adapted to fit to thereby provide a substantially complete enclosure within which slices of bread to be toasted may be located during the toasting operation. No such flange is provided, however, at the top part of the frame, whereby a narrow slot is provided between each tray and the mid-position of the frame. A construction of this kind is effective not only in preventing unduly large convection currents of air whereby loss of heat from the assembly is effected, but is also effective in maintaining the temperature of a toasted side of a slice of bread being toasted on the other side at a higher value than would be possible if the side of the tray were perforated.

While we have provided a plurality of longitudinally extending grooves 29, 31 and 33 and corresponding projections on the outside surface of member 13, we may for purposes of obtaining a more pleasing appearance, provide a plurality of vertically-extending ridges 91 centrally of each tray 17 and in a plurality of arcuate projections 93 and 95, all as shown in Fig. 1 of the drawings.

The inner ends of the struck-up portions 28 are located so far above the top of base 11 that they provide openings in the base through which a small amount of air may enter the toaster structure, flow upwardly and leave through the slots 90 at the top of the structure, as shown in Fig. 3. A user of such a toaster can gauge the progress of the toasting operation by watching the toaster and easily and quickly learn to estimate when the toasting operation is completed, by the issuance of a small amount of vapor or smoke through the slots 90.

In order to permit of energizing the resistor 53, we provide a pair of contact pins 97 insulatedly mounted adjacent to the bottom edge of that side of frame 13 which is provided with the three lugs 27. While no mounting means or insulation is shown, it is to be understood that any desired mounting and insulating means may be utilized. We wish to call attention here to the advantage of using three lugs 27 at that edge of the frame plate 13 carrying the terminal pins 97. It is possible that a poor contact may exist between the pins 97 and the sockets in a cooperating plug of the kind usually employed for this purpose and the temperature of the terminal pins 97 and of a part of the frame plate 13 may be relatively high, which might tend to cause warping of a part of the frame plate 13 immediately adjacent to the terminal pins 97. The use of three lugs 27, each of which extend through suitable openings in the plate 23 will effectively prevent such lateral warpage. In case a relatively large amount of pressure is necessary to cause engagement between the connecting plug and the terminal pins 97, the intermediate lug 27 will tend to prevent bending of the middle of the end portion of member 13 on which the terminal pins 97 are mounted.

The device embodying our invention thus provides a substantially entirely enclosed toaster structure including a relatively simple and easily and quickly assembled and disassembled heating element and bread slice support. This heating element is held at only its top and bottom edges, the top edge thereof fitting into a groove in a frame and the bottom edge being provided with a pair of spaced lugs extending through openings in the base. The trays and bread slice supports have a relatively simple hinge structure in cooperation with the base and, as hereinbefore noted, the lugs 61 are made relatively long so that it is possible to raise a tray 17 substantially vertically upwardly in order to easily and quickly effect removal of any bread crumbs which may have accumulated on the top surface of base 11 near the bottom plate 37 of the heating unit. The hinge structure of the trays, particularly the tongues 61 operate also as stop means, in combination with the inner surface of struck-up parts 28 of base 11, to limit the downward turning movement of the trays.

Various modifications may be made in the device embodying our invention without departing from the spirit and scope thereof, and it is desired, therefore, that only such limitations shall be placed thereon as are imposed by the prior art or are set forth in the appended claims.

We claim as our invention:

1. An electric toaster comprising a base, a frame plate thereon, of inverted U-shape, having a plurality of grooves formed in the under side of the horizontal portion thereof, and a vertically extending heating unit therebetween having a tongue and slot engagement with the base, the upper edge of said heating unit fitting into an intermediate groove.

2. An electric toaster comprising a base, a frame thereon in the shape of a plate of inverted U-shape having a plurality of grooves formed centrally along the inner side of its intermediate portion, one of said grooves being of narrower lateral dimension than the others, and a heating unit extending between the base and the frame, the upper end of the heating unit fitting closely in the narrower groove in the intermediate portion of the frame to hold the upper end of the unit in proper operative position.

3. An electric toaster having a vertically-extending heating unit including a resistor, a supporting plate for the resistor, and a single sheet-metal member constituting means for holding the resistor-supporting plate and slices of bread to be toasted in proper operative and relative positions, said single member including a horizontally extending top bar and a horizontally extending bottom bar in substantially the same plane and having means for engaging and holding the resistor-supporting plate and also including a plurality of bars connected to the top and the bottom bar, extending therebetween and bowed laterally outwardly from the plane of the top and the bottom bar, certain of the bowed bars being bent to one side of the plane of the top and the bottom bar and other of the bowed bars being bent to the other side of the same plane.

4. A vertical toaster having a flat-top base having an opening therein, a vertically-extending heating unit thereon, and a tray on the base at one side of the heating unit having a relatively long tongue at its bottom edge fitting into the opening in the base to constitute a pivotal mounting for the tray, the tray being movable vertically from the base without disengagement therefrom to effect removal of crumbs on the base.

5. A vertical toaster including a base, a vertically extending heating unit thereon, a tray provided with a flange and having direct pivotal engagement with the base, and having its lower edge in engagement with the base when the tray occupies its closed position, a bread-slice support inside of the lower end of the tray, a tray-actuating knob on the outside of the tray flange and a single means for securing the bread-slice support within the tray and the knob against the outside of the tray flange.

6. A device as set forth in claim 5 in which the tray-actuating knob interfits with a predetermined portion of the tray.

7. A vertical toaster including a base, a vertically-extending heating unit thereon, a tray provided with a flange and pivotally mounted on the base, and having its lower edge disposed close thereto, a bread-slice support inside of the tray, a tray actuating knob on the outside of the tray flange, and a single holding means extending through the knob, the tray flange and the bread slice support to hold these members in proper operative positions relative to each other.

8. A vertical toaster including a hollow base, a frame, of inverted U-shape, on the base, a combined heating element positioning means and bread rack supported on the base and having its upper end portion interfitting with the intermediate part of the frame, a heating element in said means, a pair of bread trays directly pivotally mounted on the base by a tongue and slot connection and engaging the frame to cooperate therewith and the base to substantially entirely enclose the heating element, a knob on each of the trays to actuate them away from and toward the frame, and resilient means engaging the unitary positioning means and the trays to yieldingly resist opening movements of the trays.

DONALD L. HADLEY.
LESTER LOWN.